United States Patent
Venkatraman et al.

(10) Patent No.: US 9,161,335 B2
(45) Date of Patent: Oct. 13, 2015

(54) METHOD AND APPARATUS FOR CANDIDATE LIST GENERATION FOR UPLINK V-MIMO

(71) Applicant: Apple Inc., Cupertino, CA (US)

(72) Inventors: Shankar Venkatraman, Dallas, TX (US); Ashvin Chheda, Plano, TX (US); Peter Michael Deane, Fitzroy Harbour (CA); Patrick Lie Chin Cheong, Ottawa (CA)

(73) Assignee: Apple Inc., Cupertino, CA (US)

(*) Notice: Subject to any disclaimer, the term of this patent is extended or adjusted under 35 U.S.C. 154(b) by 6 days.

(21) Appl. No.: 13/760,369

(22) Filed: Feb. 6, 2013

(65) Prior Publication Data

US 2013/0182665 A1    Jul. 18, 2013

Related U.S. Application Data

(63) Continuation of application No. 13/453,263, filed on Apr. 23, 2012, now abandoned, which is a continuation of application No. 12/936,409, filed as application No. PCT/US2009/041893 on Apr. 28, 2009.

(60) Provisional application No. 61/048,369, filed on Apr. 28, 2008.

(51) Int. Cl.
*H04B 1/00*    (2006.01)
*H04W 72/04*    (2009.01)
(Continued)

(52) U.S. Cl.
CPC .............. *H04W 72/04* (2013.01); *H04B 7/024* (2013.01); *H04B 7/0452* (2013.01); *H04J 11/005* (2013.01); *H04L 5/0037* (2013.01); *H04L 5/0023* (2013.01)

(58) Field of Classification Search
CPC ... H04B 7/0452; H04J 11/005; H04L 5/0023; H04L 5/0037; H04W 72/04
See application file for complete search history.

(56) References Cited

U.S. PATENT DOCUMENTS 7,714,782 B2 * 5/2010 Davis et al. .......... 342/377
8,214,715 B1    7/2012 Haiut
(Continued)

FOREIGN PATENT DOCUMENTS

WO    2008022243    2/2008

OTHER PUBLICATIONS

Office Action from Japanese Patent Application No. 2011-507567, mailed Feb. 27, 2014, Japanese version, pp. 1-6.
(Continued)

*Primary Examiner* — Edward Urban
*Assistant Examiner* — Mohammed Rachedine
(74) *Attorney, Agent, or Firm* — Meyertons, Hood, Kivlin, Kowert & Goetzel, P.C.

(57) ABSTRACT

A method selects mobile station candidates for use with virtual multiple-input multiple-output ("V-MIMO") in a communication system. The communication system includes at least one base station and a plurality of mobile stations. At least one downlink metric is determined for a first mobile station. The at least one downlink metric is used to determine eligibility for uplink V-MIMO candidate list selection. Responsive to determining that the first mobile station is eligible for uplink V-MIMO candidate list selection, the first mobile station is paired with a second mobile station eligible for uplink V-MIMO candidate list selection.

11 Claims, 6 Drawing Sheets

(51) Int. Cl.
*H04B 7/04* (2006.01)
*H04J 11/00* (2006.01)
*H04B 7/02* (2006.01)
*H04L 5/00* (2006.01)

(56) References Cited

U.S. PATENT DOCUMENTS

| | | |
|---|---|---|
| 2004/0022179 A1 | 2/2004 | Giannakis et al. |
| 2005/0136963 A1* | 6/2005 | Frank et al. .................. 455/522 |
| 2006/0039312 A1* | 2/2006 | Walton et al. ................ 370/319 |
| 2007/0053320 A1 | 3/2007 | Rinne et al. |
| 2007/0171808 A1* | 7/2007 | Wu et al. ...................... 370/208 |
| 2007/0242636 A1 | 10/2007 | Kashima et al. |
| 2007/0274199 A1 | 11/2007 | Logvinov et al. |
| 2007/0285315 A1* | 12/2007 | Davis et al. .................. 342/377 |
| 2008/0084848 A1* | 4/2008 | Jard et al. ..................... 370/332 |
| 2008/0298482 A1* | 12/2008 | Rensburg et al. ............. 375/260 |
| 2009/0113429 A1 | 4/2009 | Luschi et al. |
| 2009/0150755 A1 | 6/2009 | Chen et al. |
| 2009/0175230 A1 | 7/2009 | Callard et al. |
| 2009/0264123 A1* | 10/2009 | Agashe et al. ................ 455/434 |
| 2010/0296591 A1 | 11/2010 | Xu et al. |

OTHER PUBLICATIONS

Yang Chao et al., Adjustable determinant pairing scheduling for virtual MIMO system, Intelligent Signal Processing and Communication Systems, 2007. ISPACS 2007. International Symposium on, 2 0 0 7 iF 1 1 J.I 2 8 13, pp. 626-629.
3GPP TSG-RAN WG1 #47bis, "UE Paring for E-UTRA Uplink Multiuser MIMO", Jan. 15-19, 2007, pp. 1-5.
Extended European Search Report from Application No. 09739544. 6, mailed Oct. 28, 2014, pp. 1-9.
"Group-based User Pairing for Virtual MIMO in LTE", Qian Yu, et al., Sep. 2007, pp. 38-42.
"Cooperative Communication in Wireless Networks", Aria Nosratinia, et al., Oct. 2004, pp. 74-80.
"EUTRA Uplink System Design Options", 3GPP TSG RAN1 #46-bis, Oct. 2006.
International Search Report and Written Opinion in Application No. PCT/US2009/041893, Jun. 19, 2009, pp. 1-11.

* cited by examiner

| Random Pairing | Tput kbps | Change | Outage | Change | IoT (dB) |
|---|---|---|---|---|---|
| SIMO | 5977 | -- | 13.28% | -- | 10.68 |
| V-MIMO RP Baseline | 5945 | - 0.54% | 20.16% | - 6.88% | 11.76 |
| DL Geometry Method | 6517 | 9.04% | 13.85% | - 0.57% | 10.69 |
| PH Method | 6277 | 5.01% | 13.83% | - 0.56% | 10.79 |
| I-C Geom + PH Method | 6473 | 8.29% | 13.89% | - 0.61% | 10.71 |

*FIG. 6*

| OF Based Pairing (FSS) | Tput kbps | Change | Outage | Change | IoT (dB) |
|---|---|---|---|---|---|
| SIMO | 9727 | -- | 13.76% | -- | 10.68 |
| V-MIMO OF Baseline | 9833 | 1.10% | 17.38% | - 3.62% | 12.14 |
| DL Geometry Method | 10654 | 9.54% | 13.72% | 0.04% | 10.87 |
| PH Method | 10036 | 3.19% | 14.24% | - 0.48% | 10.87 |
| I-C Geom + PH Method | 10509 | 8.04% | 14.24% | - 0.48% | 10.89 |

| High Speed RP | Num MS | Sector Tput (kbps) | Gain |
|---|---|---|---|
| SIMO | 32 | 6458 | -- |
| VMIMO DL Geometry Method | 32 | 6953 | 7.66% |
| SIMO | 96 | 6383 | -- |
| VMIMO DL Geometry Method | 96 | 7094 | 11.13% |

| Low Speed FSS OF | Num MS | Sector Tput (kbps) | Gain |
|---|---|---|---|
| SIMO | 96 | 10079 | -- |
| DL Geometry Method | 96 | 12449 | 23.52% |

*FIG. 9*

METHOD AND APPARATUS FOR CANDIDATE LIST GENERATION FOR UPLINK V-MIMO

CROSS-REFERENCE TO RELATED APPLICATIONS

This application is continuation application of U.S. application Ser. No. 13/453,263, entitled "METHOD AND APPARATUS FOR CANDIDATE LIST GENERATION FOR UPLINK V-MIMO," filed Apr. 23, 2012. U.S. application Ser. No. 13/453,263 is a continuation application of U.S. National Stage patent application Ser. No. 12/936,409, filed Oct. 5, 2010, entitled "METHOD AND APPARATUS FOR CANDIDATE LIST GENERATION FOR UPLINK V-MIMO", which is a Submission Under 35 U.S.C. .sctn.371 for International Application Number: PCT/US2009/041893, filed Apr. 28, 2009 entitled "METHOD AND APPARATUS FOR CANDIDATE LIST GENERATION FOR UPLINK V-MIMO," which claims priority to U.S. Provisional Application Ser. No. 61/048,369, filed Apr. 28, 2008, the entirety of which all are incorporated herein by reference.

FIELD OF THE INVENTION

The present invention relates generally to a method and system for wireless communication, and more specifically to a method and system for selecting candidates for use in communication systems employing uplink virtual multiple-input multiple-output ("V-MIMO").

BACKGROUND OF THE INVENTION

Long term evolution ("LTE") represents the project within the third generation partnership project ("3GPP"), with an aim to improve the Universal Mobile Telecommunications System ("UMTS") standard. The goals are to support future requirements and include improved system capacity and coverage, reduced latency, higher peak data rates, and lower costs. The LTE project is not actually a standard, but results in an evolved release of the UMTS standard. Bandwidth is scalable in view of spectrum allocations, higher data rate requirements and deployment flexibility.

The LTE physical layer is designed to achieve higher data rates, and is facilitated by turbo coding/decoding, and higher order modulations, e.g., up to 64-QAM. LTE supports both frequency division duplexing ("FDD") and time division duplexing ("TDD") modes of operation.

Orthogonal frequency division multiple access ("OFDMA") is used for the downlink (base station to mobile station), while single carrier frequency division multiple access ("SC-FDMA") is used for the uplink (mobile station to base station). The main advantage of such schemes is that the channel response is flat over a sub-carrier even though the multi-path environment could be frequency selective over the entire bandwidth. This reduces the complexity involved in equalization, as simple single tap frequency domain equalizers can be used at the receiver. OFDMA allows LTE to achieve its goal of higher data rates, reduced latency and improved capacity/coverage, with reduced costs to the operator. By using multiple parallel data stream transmissions to a single terminal, data rate can be increased significantly. In a multi-path environment, such a multiple access scheme also provides opportunities for performance enhancing scheduling strategies.

Uplink virtual multiple-input multiple-output ("V-MIMO"), which uses spatial multiplexing ("SM") across multiple mobile stations ("MS"), promises spectral efficiency gains without the need for additional transmit antennas at the MS. Traditional MIMO uses multiple antennas at a single MS. Multiple mobile stations, each using a single transmit antenna can be assigned the same physical resource to create a virtual MIMO transmitter. Further, V-MIMO as a feature is completely transparent to the mobile and requires no additional mobile processing. However, extracting performance gains using V-MIMO in a multi-cell environment is more challenging when compared to a single user MIMO scenario. The scheduler has to select users capable of sustaining a robust link in the presence of additional inter-layer interference and determine appropriate modulation coding scheme ("MCS") downgrades. Scheduling of multiple mobiles on the same sub-carrier could result in additional inter-cell interference that will negatively affect low signal to interference ratio ("SINR") users and coverage. Scheduling of users, user pairing & link adaptation are areas that need optimization to ensure that performance gains are realized without impacting coverage. In addition, interference increases due to pairing needs to be mitigated.

VMIMO pairing techniques used in a single cell environment provides low throughput gains when deployed in a multi-cell environment. Extracting performance gains in the uplink in a multi-cell layout requires appropriate pairing of MSs that could be based on several criteria. Current pairing algorithms focus on firstly creating a V-MIMO candidate list based on the uplink received SINR for each MS. MSs in this list are paired in a random fashion or based on channel metrics, such as Orthogonal Factors ("OF"). Current schemes do not provide any sector throughput gains, but could lead to a reduction of throughput or increased outage for cell-edge users.

Candidate list generation based on Uplink received SINR ensures that each paired MS will be capable of supporting at least the lowest modulation coding scheme ("MCS") at a low frame error rate ("FER") and yields gains when V-MIMO is deployed in hot-spots. However, it does not consider the amount of additional interference that is generated due to pairing when V-MIMO is deployed over several cells. The current pairing schemes can result in increased inter-cell interference and Interference over Thermal ("IoT"). The increased IoT reduces MIMO gains leading to an overall throughput loss & poor performance for cell-edge users.

Another solution uses higher uplink SINR thresholds to add UEs to the candidate list. However, the method does not work well because V-MIMO candidate list generation is based on uplink SINR threshold. Since uplink transmissions are power controlled, cell edge UEs may use a high transmit power to attain a high receive SINR. This practice allows such UEs to qualify for the candidate list, which when paired together, generate significant amounts of interference to neighboring cells. As this threshold is increased, very few UEs qualify for the candidate list. But, these UEs can create significant interference to neighboring sectors. Again, the overall interference increase is not mitigated and the SM gains are minimal because most UEs do not qualify for the candidate list.

Therefore, what is needed is a method and system for candidate list generation which maximizes the benefits of V-MIMO.

SUMMARY OF THE INVENTION

The present invention advantageously provides a method, apparatus and system for selecting mobile station candidates for use with virtual multiple-input multiple-output ("V-

MIMO"). Embodiments of the present invention provide different criteria to qualify a mobile station for the V-MIMO candidate list. These additional criteria ensure that the overall inter-sector interference levels remain the same as in a non V-MIMO system such that the overall throughput gains are maximized without degrading cell-edge user performance.

In accordance with one embodiment of the present invention, a method is provided for selecting mobile station candidates for use with virtual multiple-input multiple-output ("V-MIMO") in a communication system. The communication system includes at least one base station and a plurality of mobile stations. At least one downlink metric is determined for a first mobile station. The at least one downlink metric is used to determine eligibility for uplink V-MIMO candidate list selection. Responsive to determining that the first mobile station is eligible for uplink V-MIMO candidate list selection, the first mobile station is paired with a second mobile station eligible for uplink V-MIMO candidate list selection.

In accordance with another aspect of the present invention, an apparatus is provided for use in a communication system. The communication system includes a plurality of mobile stations. The apparatus includes a transceiver and a candidate list generator. The transceiver is operable to receive at least one downlink metric for a first mobile station. The candidate list generator is electrically connected to the transceiver. The candidate list generator is operable to use the at least one downlink metric to determine eligibility for uplink V-MIMO candidate list selection, and if the first mobile station is eligible for uplink V-MIMO candidate list selection, pair the first mobile station with a second mobile station eligible for uplink V-MIMO candidate list selection.

In accordance with another aspect of the present invention, a communication system employing V-MIMO includes a plurality of mobile stations and at least one base station communicating with at least a portion of the plurality of mobile stations. The at least one base station is operable to determine at least one downlink metric for a first mobile station and use the at least one downlink metric to determine eligibility for uplink V-MIMO candidate list selection. Responsive to determining the first mobile station is eligible for uplink V-MIMO candidate list selection, the base station is further operable to pair the first mobile station with a second mobile station eligible for uplink V-MIMO candidate list selection.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

As an initial matter, while certain embodiments are discussed in the context of wireless networks operating in accordance with the 3rd Generation Partnership Project ("3GPP") evolution, e.g., Long Term Evolution ("LTE") standard, etc., the invention is not limited in this regard and may be applicable to other broadband networks including those operating in accordance with other orthogonal frequency division multiplexing ("OFDM")-based systems including WiMAX (IEEE 802.16) and Ultra-Mobile Broadband ("UMB"), etc. Similarly, the present invention is not limited solely to OFDM-based systems and can be implemented in accordance with other system technologies, e.g., code division multiple access ("CDMA"), single carrier frequency division multiple access ("SC-FDMA"), etc.

Before describing in detail exemplary embodiments that are in accordance with the present invention, it is noted that the embodiments reside primarily in combinations of apparatus components and processing steps related to improving the candidate selection list generation of a communication system using virtual multiple-in multiple-out ("V-MIMO") schemes. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

One embodiment of the present invention advantageously provides different criteria to qualify a mobile station to the V-MIMO candidate list. These additional criteria ensure that the overall inter-sector interference levels remain the same as in a non V-MIMO system such that the overall throughput gains are maximized without degrading cell-edge user performance. The V-MIMO candidate list selection is based on mobiles that contribute the least interference to neighboring cells/sectors.

Figure 1:
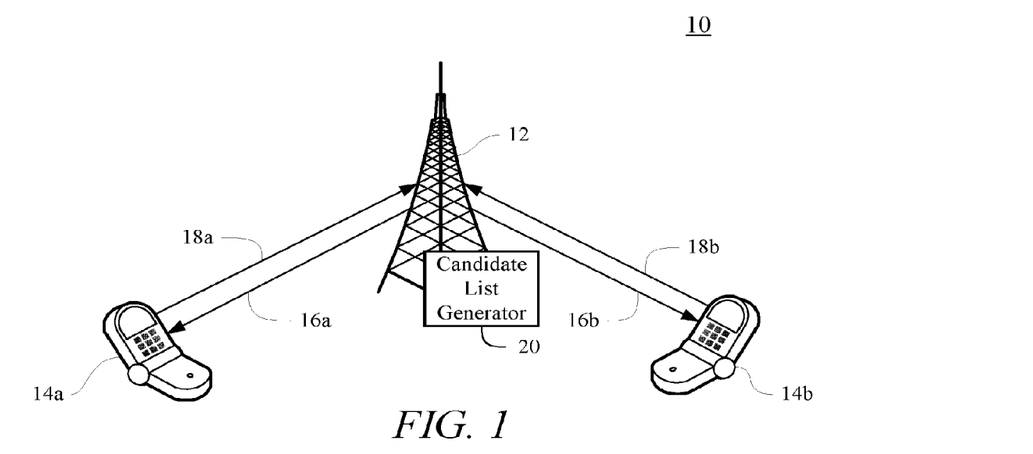
FIG. 1 is a block diagram of an exemplary OFDMA communication system constructed in accordance with the principles of the present invention.

Referring now to the drawing figures in which like reference designators refer to like elements, there is shown in FIG. 1, an exemplary orthogonal frequency division multiple access ("OFDMA") communication system 10 is provided in accordance with the principles of the present invention. Communication system 10 includes at least one base station ("BS") 12 communicating with a plurality of mobile stations ("MS") 14a, 14b (referenced collectively as mobile station 14). Although only one base station 12 and two mobile stations 14 are shown in FIG. 1 for illustrative purposes, it should be noted that communication system 10 may include any number of base stations 12 and mobile stations 14.

According to one embodiment, mobile station 14 may include a wide range of portable electronic devices, including but not limited to mobile phones, personal data assistants ("PDA") and similar devices, which use the various communication technologies such as LTE, advanced mobile phone system ("AMPS"), time division multiple access ("TDMA"), CDMA, global system for mobile communications ("GSM"), general packet radio service ("GPRS"), 1× evolution-data optimized (abbreviated as "EV-DO" or "1×EV-DO") and universal mobile telecommunications system ("UMTS"). The mobile station 14 also includes the hardware and software suitable to support the control plane functions needed to engage in wireless communication with base station 12. Such hardware can include a receiver, transmitter, central processing unit, storage in the form of volatile and nonvolatile memory, and input/output devices, among other hardware.

Base station 12 transmits information to the mobile stations 14 using a downlink channel 16a, 16b. In a similar manner, mobile stations 14 transmit information to the base station 12 using an uplink channel 18a, 18b. The base station 12 may also include a candidate list generator 20, which determines the mobile stations 14 for inclusion in V-MIMO. The candidate list generator 20 may include a CPU, memory, I/O devices and programmatic software code to implement the functions performed by the candidate list generator 20. Operation of the candidate list generator 20 is discussed in greater detail below.

Figure 2:
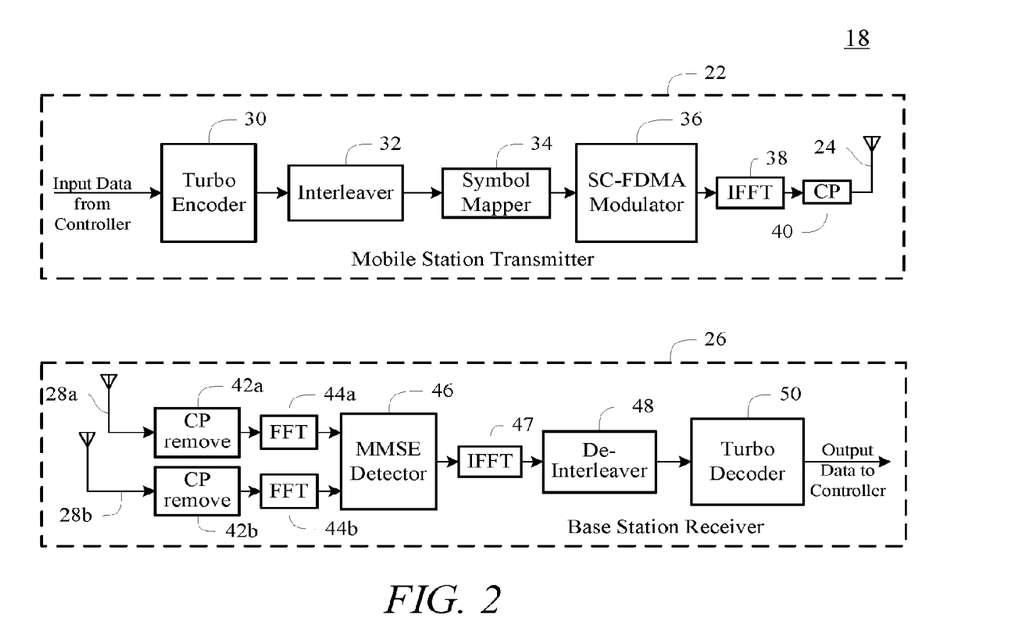
FIG. 2 is a block diagram of an exemplary Long Term Evolution ("LTE") uplink channel constructed in accordance with the principles of the present invention.

Referring now to FIG. 2, a block diagram for an exemplary uplink channel 18 provided. Uplink channel 18 consists of a mobile station 14 having a transmitter 22 with a single transmit antenna 24 and a base station 12 having a receiver 26 that uses two receive antennas 28a, 28b. The transmitter 22 uses a turbo convolutional code ("TCC") encoder 30 to encode data from the controller (not shown) with generator polynomials in octal form. The TCC encoder 30 is followed by a random interleaver 32 and a constellation mapper 34 followed by an SC-FDMA modulator 36 to map coded bits to modulated symbols. The modulated symbols are then transformed from the frequency domain to the time domain by an inverse fast Fourier transform ("IFFT") 38 and a cyclic-prefix ("CP") 40 is added before the resulting SC-FDMA signal is transmitted through the antenna 24.

At the receiver 26 side, the inverse process is followed. Two receive antennas 28a, 28b receive SC-FDMA signals. A CP remover 42a, 42b strips the CP from the signal, which is then converted from the time domain to the frequency domain via a fast Fourier transform 44a, 44b. A minimum mean square error ("MMSE") detector 46 performs frequency domain equalization and is followed by IFFT 47 to recover time domain symbols. This is followed by random de-interleaver 48 and a turbo decoder 50. The de-interleaver 48 is used to compensate for the interleaving operation used at the transmitter 22. Decoded data from the turbo decoder 50 is sent on to the base station 12 controller (not shown) for further processing.

Figure 3:
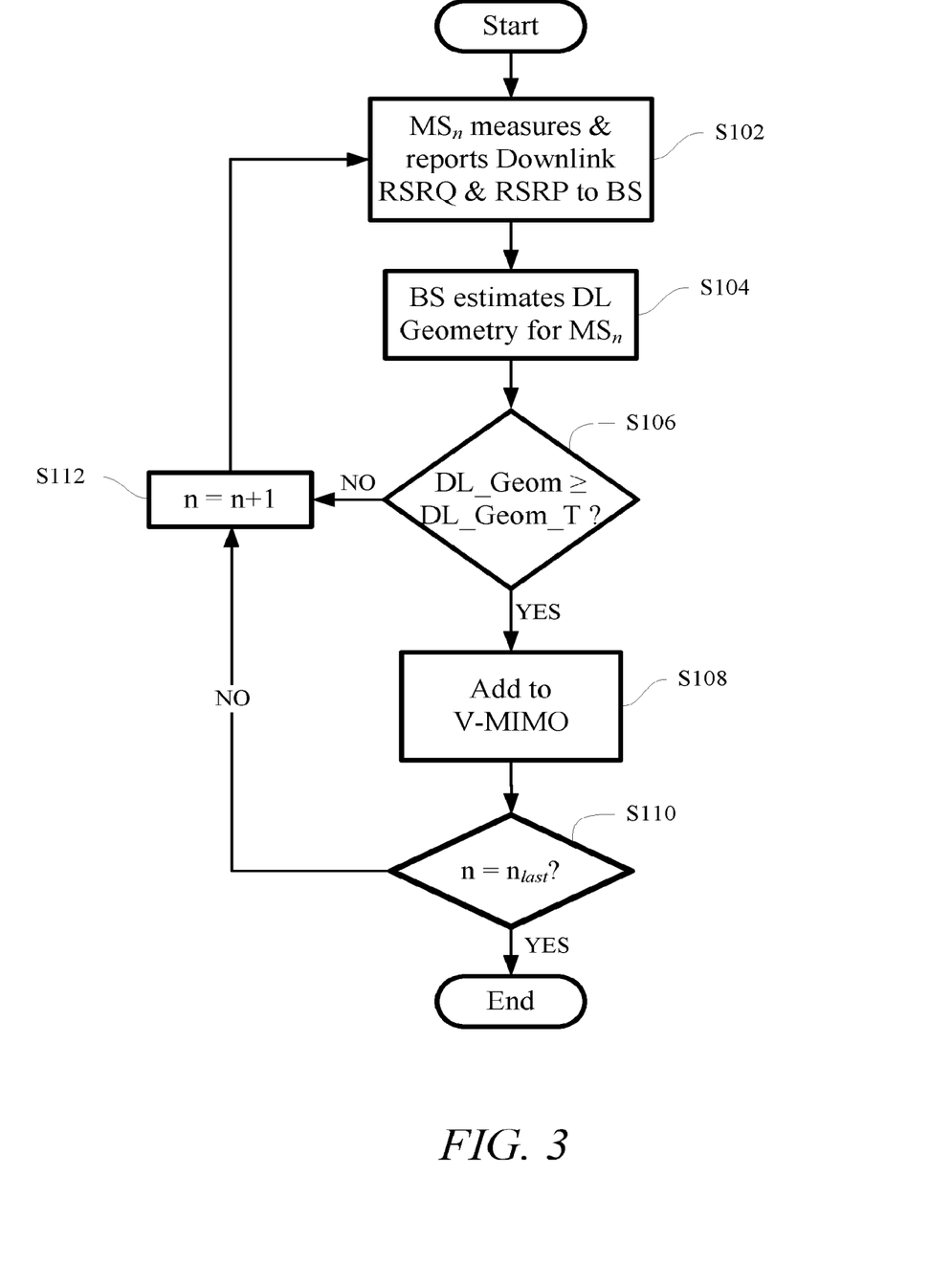
FIG. 3 a flow chart of an exemplary candidate selection list generation process based on downlink geometry metrics according to the principles of the present invention.

Referring now to FIG. 3, an exemplary operational flowchart is provided that describes steps to generate a candidate list based on a downlink geometry metric (hereinafter referenced as "the DL Geometry method"). This metric is a true reflection of the interference generated by the MS 14 to neighboring sectors, and hence can provide optimized performance. The process uses measurements made by each MS 14 that are signaled back to the BS 12 in the form of periodic and/or event-triggered reports. The process begins when a first MS 14, e.g., $MS_n$, estimates downlink Reference Signal Received Quality ("RSRQ") and Reference Signal Received Power ("RSRP") and reports these measurements to the BS 12 (step S102). Alternatively, DL geometry may also be estimated using DL channel quality information ("CQI") or modulation coding scheme ("MCS") reports that the MS 14 provides as feedback. Average DL Geometry may also be reverse engineered based on the DL MCS chosen by the MS 14. The candidate list generator 20 of the BS 12 estimates average downlink geometry by averaging downlink measurement reports for $MS_n$ (step S104). If the average DL geometry for $MS_n$ is greater than a predetermined threshold value, i.e. DL_Geometry≥DL_Geometry Thresh (step S106), then $MS_n$ qualifies for the V-MIMO candidate list (step S108). It should be noted that DL_Geometry_Thresh is a configurable parameter. If there are additional MSs 14 that have not been tested, i.e., $n \ne n_{last}$, (step S110), the candidate list generator 20 increments n (step S112) to test the next candidate, i.e. $MS_{n+1}$. Returning to decision block S106, if $MS_n$ is not a suitable candidate for V-MIMO selection, i.e. DL_Geometry<DL_Geometry_Thresh, then the candidate list generator 20 increments n (step S112) to test the next candidate, i.e. $MS_{n+1}$. Additionally, it should be noted that other filters, such as Uplink Rx SINR, may be applied for additional filtering.

Figure 4:
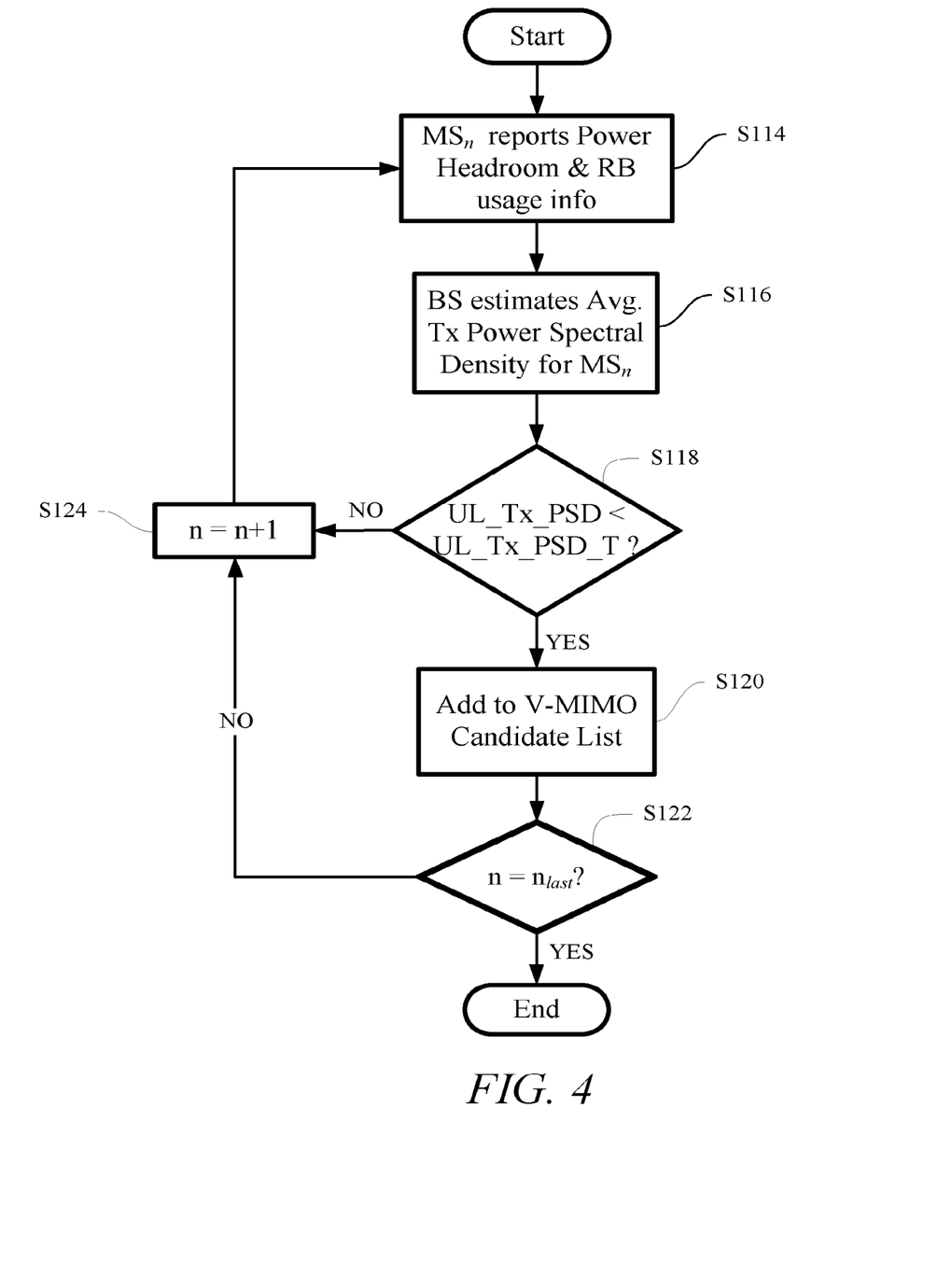
FIG. 4 a flow chart of an exemplary candidate selection list generation process based on power headroom metrics according to the principles of the present invention.

Referring now to FIG. 4, an exemplary operational flowchart is provided that describes steps of an alternative method to generate a candidate list based on a power headroom ("PH") metric (hereinafter referenced as "the PH method"). The PH metric estimates the transmission ("Tx") power of the MS 14 to qualify MSs that use low Tx Power into the candidate list. This metric ensures that only MSs at low electrical distance are selected for V-MIMO and, consequently, minimize inter-cell interference. However, since the PH metric does not consider interference generated to neighboring sectors, the results are not as substantial as those generated by the DL Geometry method.

The process begins when a first MS 14, e.g., $MS_n$, estimates PH available when transmitting over N tones on the uplink and reports the PH and the number of tones used for the PH calculation to the BS 12 (step S114). The candidate list generator 20 of the BS 12 estimates average transmission power spectral density ("PSD") used by $MS_n$ according to the equation Avg TX PSD=(Total Available Power−Used Power (PH)/N where N is the number of tones used corresponding to the reported PH (step S116). If the average transmission PSD for $MS_n$ is less than a predetermined threshold value, i.e. Avg UL_Tx_PSD≤UL_Tx_PSD_Thresh), (step S118), then $MS_n$ qualifies for the V-MIMO candidate list (step S120). It should be noted that UL_Tx_PSD_Thresh is a configurable parameter. If there are additional MSs 14 that have not been tested, i.e., $n \ne n_{last}$, (step S110), the candidate list generator 20 increments n (step S124) to test the next candidate, i.e. $MS_{n+1}$. Returning to decision block S118, if $MS_n$ is not a suitable candidate for V-MIMO selection, i.e. UL_Tx_PSD>UL_Tx_PSD_Thresh, then the candidate list generator 20 increments n (step S124) to test the next candidate, i.e. $MS_{n+1}$. Additionally, it should be noted that other filters, such as Uplink Rx SINR, may also be applied for additional filtering.

Figure 5:
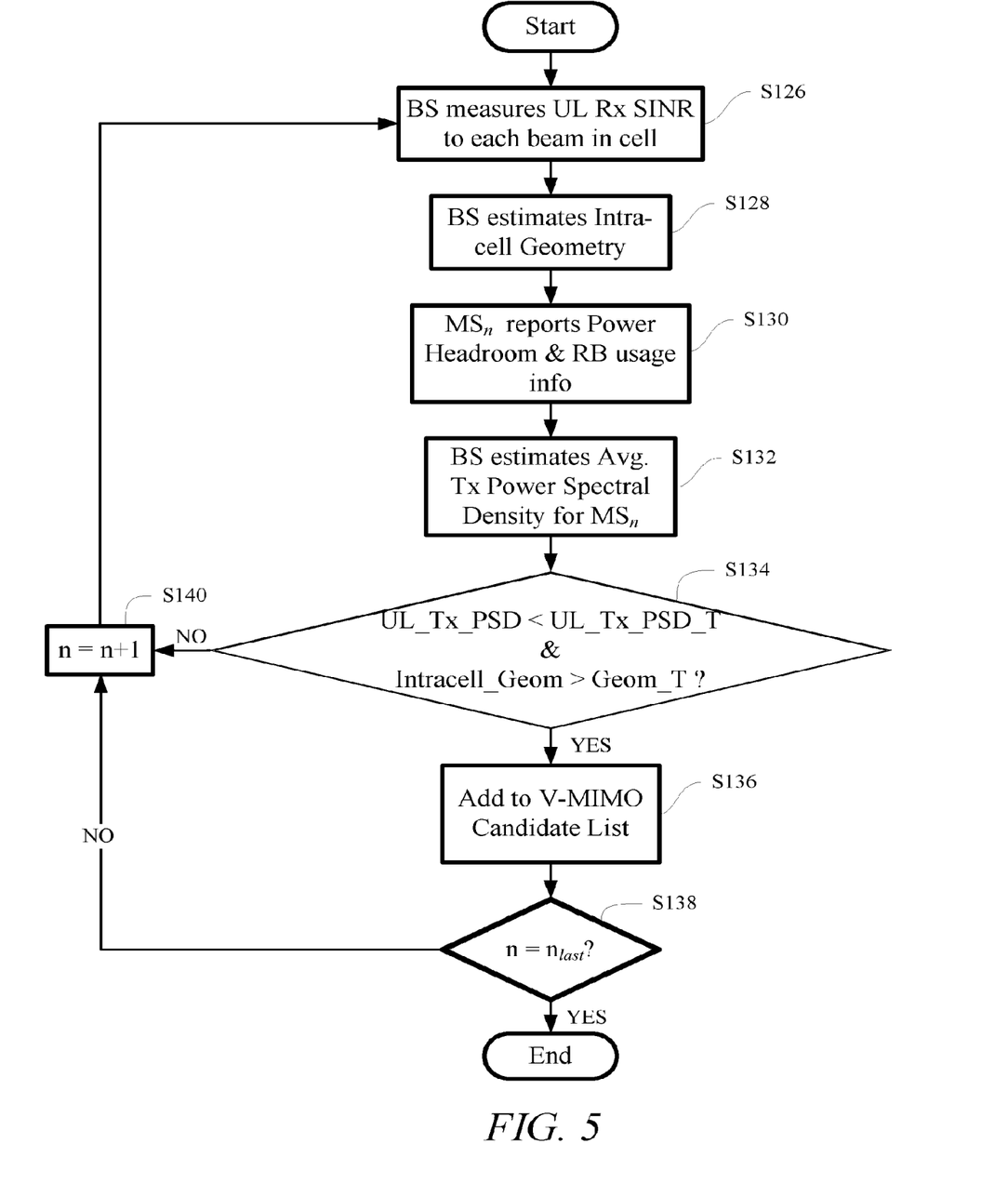
FIG. 5 a flow chart of an exemplary candidate selection list generation process based on intra-cell geometry and power headroom metrics according to the principles of the present invention.

Referring now to FIG. 5, an exemplary operational flowchart is provided that describes steps of another alternative method to generate a candidate list based on a combination of intra-cell ("I-C") geometry and power headroom metrics (hereinafter referenced as "the I-C geometry+PH method"). This method provides an improvement over the PH method by combining knowledge of path loss of an MS 14 to different beams or sectors of the serving BS 12 along with the PH information. In combination, it is used to weed out MSs that can generate significant inter-cell interference as well as significant inter-sector interference. This method requires additional processing on the BS 12 for non-Spatial-Division Medium Access ("SDMA") sectors, as the BS 12 has to estimate the Uplink SINR for each MS across all sectors. In the case of an SDMA sector, the Uplink SINR is estimated for each MS across the beams in a sector and does not need any additional computation.

The BS 12 estimates path-loss, i.e. electrical distance, of a first MS 14, e.g., $MS_n$ to each of the beams or sectors of the serving cell using uplink SINR measurements (step S126). Typically, a single BS 12 serves three sectors, but when using SDMA, each sector may be served by 2 beams. Therefore, in an SDMA cell, each BS 12 may theoretically support 6 beams. The candidate list generator 20 of the BS 12 calculates an intra-cell geometry using the path-loss estimate (step S128) according to the formula $$Geometry_{Intra-cell} = \frac{Pathloss_{desired\ sector}}{\sum_{\substack{j=1 \\ j \neq desired\ sector}}^{Numsectors} Pathloss_j}. \quad (1)$$

The MS 14, e.g., $MS_n$, estimates PH available when transmitting over N tones on the uplink and reports the PH and the number of tones used for the PH calculation to the BS 12 (step S130). The candidate list generator 20 of the BS 12 estimates average transmission power spectral density ("PSD") used by $MS_n$ according to the equation Avg TX PSD=(Total Power−Average PH)/N where N is the number of tones used corresponding to the reported PH (step S132). If the average transmission PSD for $MS_n$ is less than a predetermined threshold value, i.e. Avg UL_Tx_PSD≤UL_Tx_PSD_Thresh), and the intra-cell geometry for $MS_n$ is greater than a predetermined threshold value, i.e. Intracell_Geom≥Geom_Thresh (step S134), then $MS_n$ qualifies for the V-MIMO candidate list (step S136). UL_Tx_PSD_Thresh & Geom_Thresh are configurable parameters. If there are additional MSs14 that have not been tested, i.e., n≠$n_{last}$ (step S138), the candidate list generator 20 increments n (step S140) to test the next candidate, i.e. $MS_{n+1}$. Returning to decision block S134, if $MS_n$ is not a suitable candidate for V-MIMO selection, i.e. UL_Tx_PSD>UL_Tx_PSD_Thresh, then the candidate list generator 20 increments n (step S140) to test the next candidate, i.e. $MS_{n+1}$. Additionally, it should be noted that other filters, such as Uplink Rx SINR, may also be applied for additional filtering.

Figure 6:
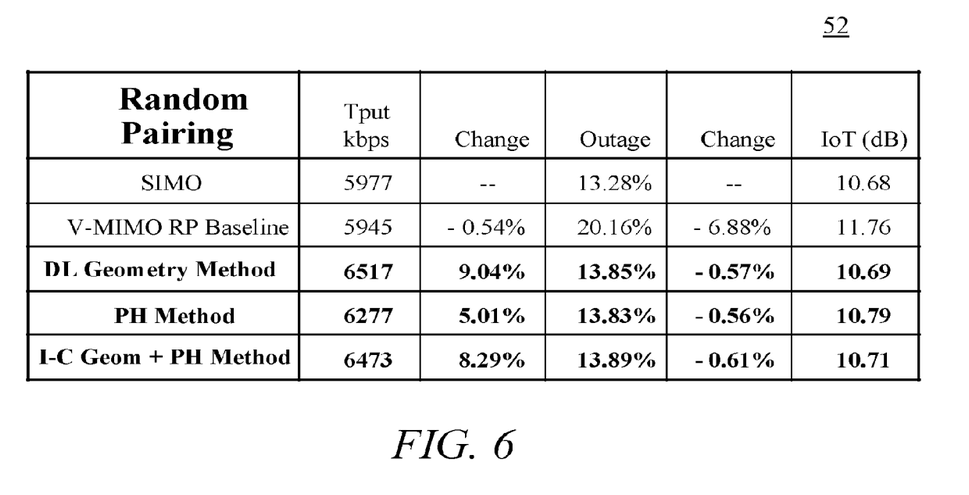
FIG. 6 is a table comparing throughput results using different selection methods with random pairing and baseline random pairing.
Figure 7:
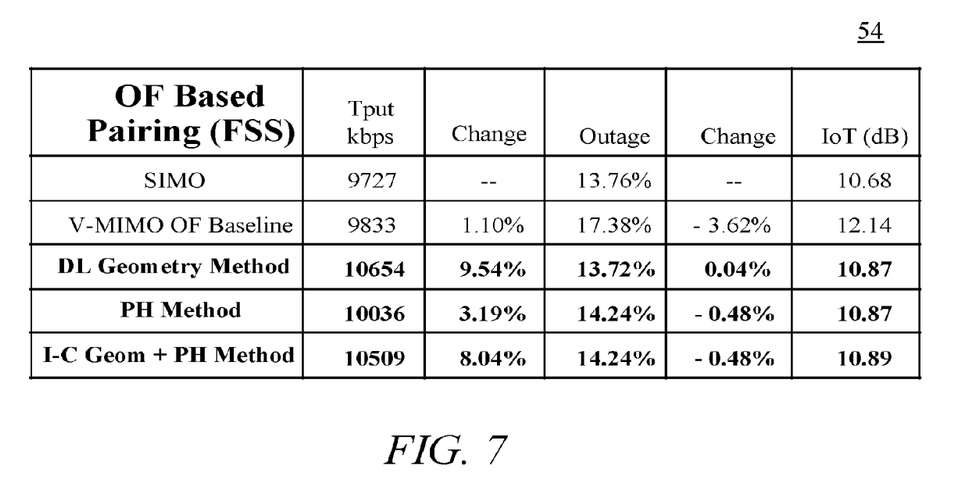
FIG. 7 is a table comparing throughput results using different selection methods with orthogonal factor ("OF") based pairing and baseline OF pairing.

Referring now to FIGS. 6 and 7, simulation results are provided which compare throughput, outage and interference over thermal ("IoT") results using the methods described above in relation to a traditional single-input multiple-output ("SIMO") system, as well as a baseline of a system using V-MIMO where the candidate list is generated by prior art methods. In FIG. 6, the results of table 52 are for the scenario where the candidate list generation methods are used in combination with a random pairing means. In FIG. 7, the results of table 52 are for the scenario where the candidate list generation methods are used in combination with an OF-based pairing method. While each of the methods of the present invention, i.e. the DL Geometry method, the PH method and the I-C Geometry+PH method, provides significant gains in overall throughput, the methods do not result in the increased outage or IoT, e.g., cell edge performance, as seen with traditional V-MIMO methods.

Figure 8:
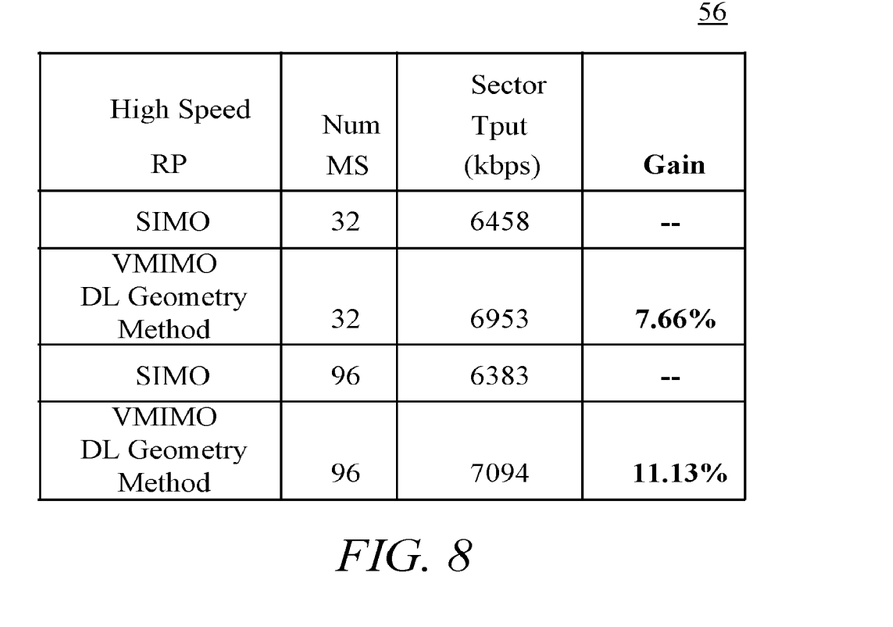
FIG. 8 is a table showing peak performance gains of one VMIMO candidate selection list generation method for high speed users.
Figure 9:
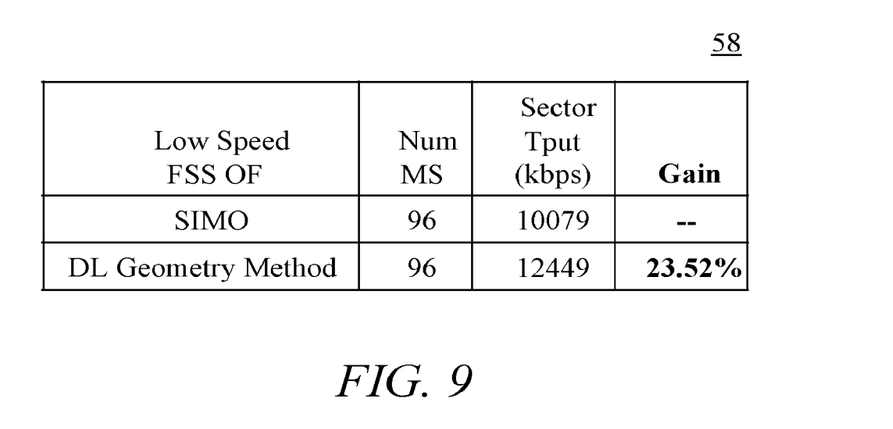
FIG. 9 is a table showing peak performance gains of one VMIMO candidate selection list generation method for low speed users.

Referring now to FIGS. 8 and 9, simulation results are provided which show peak throughput performance gains of the DL Geometry method. In FIG. 8, the results of table 56 are for high speed users with random pairing when 32 or 96 mobile stations are using V-MIMO in the system. In FIG. 9, the results of table 58 are for the low speed users with OF based pairing when 96 mobile stations are using V-MIMO. As clearly indicated, the DL Geometry method may provide performance gains of 10-23%.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method for selecting mobile station candidates for use with virtual multiple-input multiple-output ("V-MIMO") in a communication system, the communication system including at least one base station and a plurality of mobile stations, the method comprising:
sending, by the at least one base station, at least one signal to a first mobile station of the plurality of mobile stations;
receiving, by the at least one base station, a report from the first mobile station, wherein the report includes a downlink metric measured by the first mobile station;
estimating a downlink geometry for the first mobile station based on at least the downlink metric;
estimating an average transmit power spectral density for the first mobile station;
determining, dependent upon the downlink geometry and the average transmit power spectral density, eligibility of the first mobile station for uplink V-MIMO candidate list selection, wherein said determining comprises determining that the average transmit power spectral density is less than a first predetermined threshold and that the downlink geometry is greater than a second predetermined threshold;
responsive to determining the first mobile station is eligible for uplink V-MIMO candidate list selection, pairing the first mobile station with a second mobile station also determined to be eligible for uplink V-MIMO candidate list selection.

2. The method of claim 1, further comprising using the paired mobile stations for V-MIMO.

3. The method of claim 1, wherein the at least one downlink metric is at least one of a downlink reference signal received quality, a downlink reference signal received power, a channel quality information report, and a modulation coding scheme report.

4. An apparatus for use in a communication system, the communication system including a plurality of mobile stations, the apparatus comprising:
a plurality of downlink channels, wherein each downlink channel of the plurality of downlink channels is configured to send information to at least one mobile station of the plurality of mobile stations;
a plurality of uplink channels, wherein each uplink channel of the plurality of uplink channels is configured to receive information from at least one mobile station of the plurality of mobile stations; and processing hardware coupled to a transceiver, wherein the processing hardware is configured to implement a candidate list generator, the candidate list generator configured to:

send at least one signal to a first mobile station of the plurality of mobile stations via a given one of the plurality of downlink channels;

receive a report from the first mobile station, wherein the report includes a downlink metric measured by the first mobile station;

estimate a downlink geometry for the first mobile station based on at least the downlink metric;

estimate an average transmit power spectral density for the first mobile station;

determine eligibility of the first mobile station for uplink virtual multiple-in multiple-out ("V-MIMO") candidate list selection dependent upon the downlink geometry and the average transmit power spectral density, wherein said determining comprises determining that the average transmit power spectral density is less than a first predetermined threshold and that the downlink geometry is greater than a second predetermined threshold; and responsive to determining the first mobile station is eligible for uplink V-MIMO candidate list selection, pair the first mobile station with a second mobile station also determined to be eligible for uplink V-MIMO candidate list selection.

5. The apparatus of claim 4, wherein the at least one downlink metric is at least one of a downlink reference signal received quality, a downlink reference signal received power, a channel quality information report, and a modulation coding scheme report.

6. A communication system employing virtual multiple-input multiple output ("V-MIMO"), the communication system comprising:

a plurality of mobile stations; and at least one base station in communication with at least a portion of the plurality of mobile stations, the at least one base station configured to send at least one signal to a first mobile station of the plurality of mobile stations;

wherein the first mobile station of the plurality of mobile stations is configured to:

measure a downlink metric from at least one signal sent by the at least one base station; and report the downlink metric to the at least one base station;

wherein the at least one base station is further configured to:

estimate a downlink geometry for the first mobile station based on at least the downlink metric;

estimate an average transmit power spectral density for the first mobile station;

determine eligibility of the first mobile station for uplink V-MIMO candidate list selection dependent upon the downlink geometry and the average transmit power spectral density, wherein said determining comprises determining that the average transmit power spectral density is less than a first predetermined threshold and that the downlink geometry is greater than a second predetermined threshold; and responsive to determining the first mobile station is eligible for uplink V-MIMO candidate list selection, pair the first mobile station with a second mobile station also determined to be eligible for uplink V-MIMO candidate list selection.

7. The communication system of claim 6, wherein the base station is further configured to use the paired mobile stations for V-MIMO.

8. The communication system of claim 6, wherein the at least one downlink metric is at least one of a downlink reference signal received quality, a downlink reference signal received power, a channel quality information report, and a modulation coding scheme report.

9. The method of claim 1, wherein the communication system includes at least one cell having a plurality of beams, wherein the method further comprises:

measuring an uplink receive signal-to-interference ratio from the first mobile station to each beam;

estimating an electrical distance from the first mobile station to each beam;

wherein determining the eligibility of the first mobile station for uplink V-MIMO candidate list selection is based on said estimating the electrical distance.

10. The apparatus of claim 4, wherein the communication system includes at least one cell having a plurality of beams, wherein the processing hardware is further configured to:

measure an uplink receive signal-to-interference ratio from the first mobile station to each beam;

estimate an electrical distance from the first mobile station to each beam;

wherein determining the eligibility of the first mobile station for uplink V-MIMO candidate list selection is based on said estimating the electrical distance.

11. The apparatus of claim 4, wherein the communication system includes at least one cell having a plurality of beams, wherein the at least one base station is further configured to:

measure an uplink receive signal-to-interference ratio from the first mobile station to each beam;

estimate an electrical distance from the first mobile station to each beam;

wherein determining the eligibility of the first mobile station for uplink V-MIMO candidate list selection is based on said estimating the electrical distance.

* * * * *